United States Patent [19]

Björshol

[11] 3,985,339
[45] Oct. 12, 1976

[54] TRAWL WINCH
[75] Inventor: Öyvind Ottar Björshol, Langoyneset, Norway
[73] Assignee: P. Bjorshol Mek. Verksted, Langoyneset, Norway
[22] Filed: July 18, 1974
[21] Appl. No.: 489,765

[30] Foreign Application Priority Data
July 18, 1973 Norway.............................. 2923/73

[52] U.S. Cl................................ 254/137; 254/184
[51] Int. Cl.².......................................... A01K 73/06
[58] Field of Search............... 254/183, 184, 185 R, 254/137, 150 R

[56] References Cited
UNITED STATES PATENTS

| | | | |
|---|---|---|---|
| 2,555,676 | 6/1951 | Clark | 254/137 |
| 2,947,397 | 8/1960 | Pietsch | 254/185 |
| 3,071,099 | 1/1963 | Cutlan | 254/184 |
| 3,477,697 | 11/1969 | Schreier | 254/184 |

FOREIGN PATENTS OR APPLICATIONS
956,268  12/1956  Germany ............................. 254/184

Primary Examiner—Robert J. Spar
Assistant Examiner—Kenneth Noland
Attorney, Agent, or Firm—Watson, Cole, Grindle & Watson

[57] ABSTRACT

A trawl winch for hauling in and paying out a pair of lines and a trawl net, without the use of additional winches, comprises a pair of coaxially mounted drums each of which is provided with end flanges, the end flanges situated at the drum ends facing each other, being of a diameter less than the diameter of the end flanges situated remote from each other, and individual drive means associated with each of the said drums so that each individual tow line of a trawl may be hauled at that speed which at that time is suitable, and when the hauling is advanced so that the trawl net meets the winch, the net can be wound around the combined spools formed by the tow lines.

1 Claim, 4 Drawing Figures

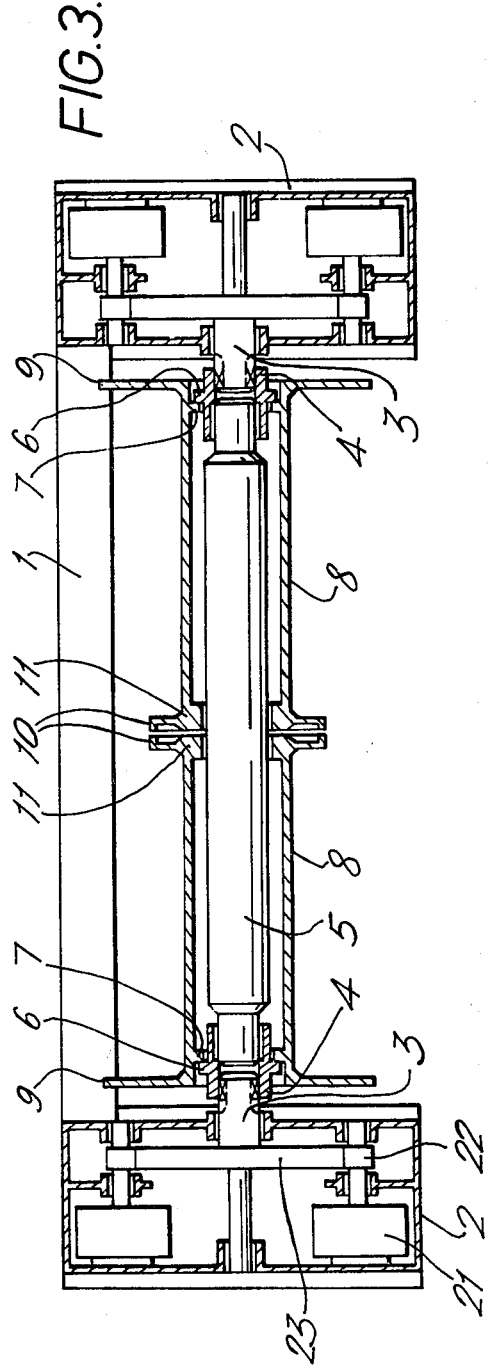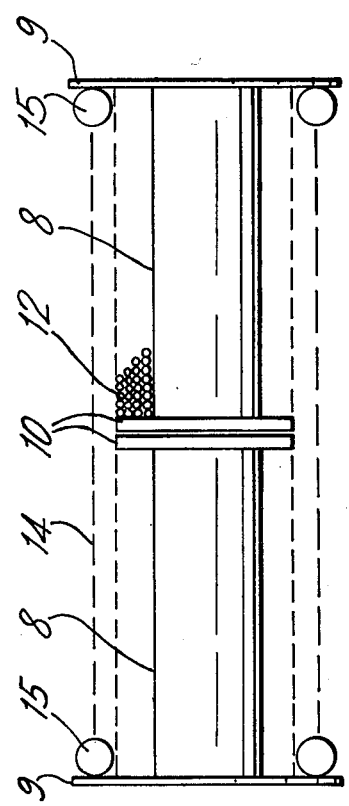

TRAWL WINCH

The hauling of a trawl on to a vessel, wether a bottom trawl or a floating trawl, is accompanied by inconveniences, and demands appliances and manual work. This is due to the great length of the tow lines and the presence of the great number of weights, iron balls, and buoyant members arranged along the trawl mouth. The balls and members are of essentially greater dimensions than the tow lines and take even more space than the trawl net when the latter is in flattened out condition.

The consequence is that it is now usual in stern trawlers to haul the tow lines of a bottom trawl by means of one common, or individual winches, until the first of the iron balls, the so-called bobbies, have entered the trawl deck and reached the line winch, whereupon the lines are loosened and hauled on by means of further winches, usually an end of an anchor winch forward in the vessel, until the series of iron balls are positioned along a horse shoe formed sill on the trawl deck. The trawl net proper is then hauled on to the deck by means of particular ends of the tow line winch, and the aft portion of the net, with its content of fish, is then taken aboard by use of a special gallow extending athwartship above the stern ramp to be emptied through an opening in the trawl deck. Hereby, it is necessary that the hauling is effected the whole time on the same deck, i.e. that the other winches, such as the anchor winches have to be positioned at the height of the trawl deck and not on a higher weather deck as usual aboard vessels, and fore-and-aft space must be provided along the superstructure to both sides of the vessel forwardly to such winches. As indicated, three different sets of winches are required for the hauling, in addition to the equipment in connection with the ramp gallow.

From the U.S. Pat. No. 2,555,676 a trawl winch is known which is provided with a number of tow line drums arranged in axial alignment and adapted to accomodate the trawl net as a unitary spool around all the line spools on their drums. The individual line drums are adapted to be driven from a common drive shaft through individual gears, clutch means being provided for engagement and disengagement of the individual gears at will. As all gears are connected to one and the same source of driving power, it is not possible, in operation, to adjust the rotational speed of any individual drum relatively to the rotational speeds of the remaining drums, to the effect that the rotational speeds of the various drums, when in operation, are always in locked relations to the rotational speeds of the other drums. The only possibility of obtaining any difference in the hauling of the various lines, is to disengage/engage the individual drums.

The object of the present invention is a simple and trustworthy winch for the hauling of a trawl, whether a bottom trawl or a floating trawl of a type wherein the individual tow lines are wound up on individual drums arranged in axial alignment and wherein the winding up of the trawl net is effected around the spools formed by the wound-up lines. According to the invention, the inconveniences referred to above are avoided by the provision of individual, independently adjustable drive means to each of the two drums of the winch. Consequently, by means of such a winch, each individual tow line of a trawl may at any time be hauled at just that speed which at that time is suitable to the total hauling, and when the hauling is so far advanced that the trawl net meets the winch, the net will be wound up around the combined spools formed by the tow lines.

Each individual drum is, at the end facing the other drum, supported by an axle which is again supported against the base at the other end of the drum and which is not partaking in the rotational movement of the drum. Consequently, the individual drum is supported by an axle extending freely from a support on the base, but must suitable it is to make the axles which support the individual drums in the form of a common, through axle, common to the two drums and supported at both ends from the base, i.e. at the ends remote from the drum ends which face each other. In this preferred embodiment, with a through axle, the supporting of the axle ends is simplified and the mechanical strains are less than in an arrangement of each drum on its own free axle, as the stands forming the supports are then co-operating and not individually subjected to a moment directed towards the mean point between the drums.

Obviously, each individual drum may be driven in a number of different ways from a drive source arranged at each of the drum ends situated remotely from each other. In a preferred embodiment, which is simple and provides a satisfactory support of the two ends of a through supporting axle, a sleeve is arranged in that end of each drum which is situated remotely from the other drum, such sleeve being secured to the drum, connected to a drive means and serving to support one end of the through axle. In such an arrangement, not only each individual drum may be driven at just the rotational speed suitable to the hauling of the tow line in question at any time, but a support is also provided for the through axle, allowing the same to float freely without any other torque than that possibly caused by the friction in the various points of support at the ends of the two drums.

The accompanying drawings schematically illustrate a preferred embodiment of a winch according to the invention.

FIG. 3 is a horizontal sectional view through the drum axis.

FIG. 4 is a sketch showing the drums with wound on lines and net.

Figure 1:
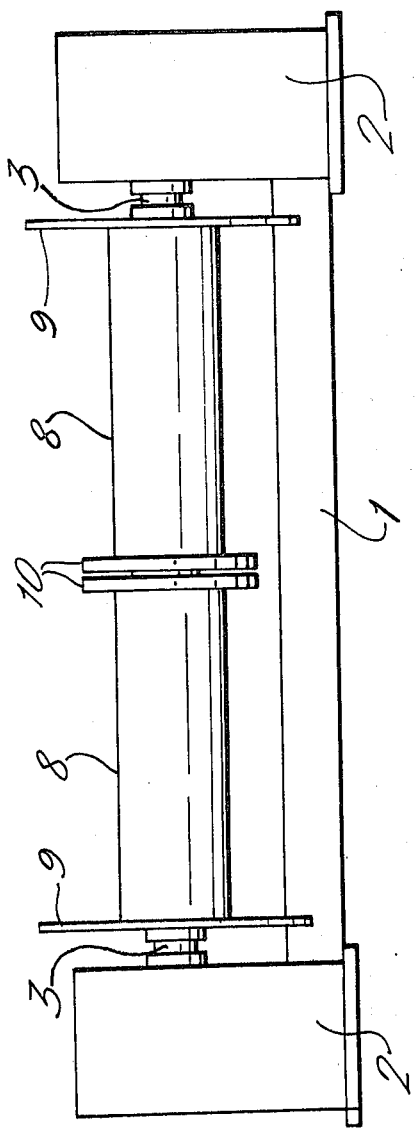
FIG. 1 is a side view of the winch.

In the drawings, 1 is the winch base which at each end is provided with a gear housing 2 having a central axle 3 extending freely towards the other gear housing. Each axle 3 is in gear mesh with an internal gearing at one end of a sleeve 4, the other end of which is in free engagement with the end of an axle 5, the sleeve 4 being connected, through a flange connection 6, 7 to a drum having a jacket 8 and end flanges 9 and 10. At that end of the drum at which the flange 10 is situated, the drum is supported on the axle 5 through an annular foot 11. Thus, the axle 5 will float with no positive rotation in the two sleeves 4, each of which is supprted by an axle end 3, and in the middle form a sliding support to those ends of the drums which are adjacent to each other.

Each of the gear housings 2 accomodates, in an ordinary manner, a double gear system, each with its own, preferably hydraulic, motor 21 with gear 22 in double mesh with a gear 23 secured to the axle which presents the axle end 3.

With the present double winch, in which each individual drum has its own drive, it is possible to haul or veer two tow lines simultaneously in a highly restricted space, and hereby adjust the hauling or veering of each individual line independently of the other.

Figure 2:
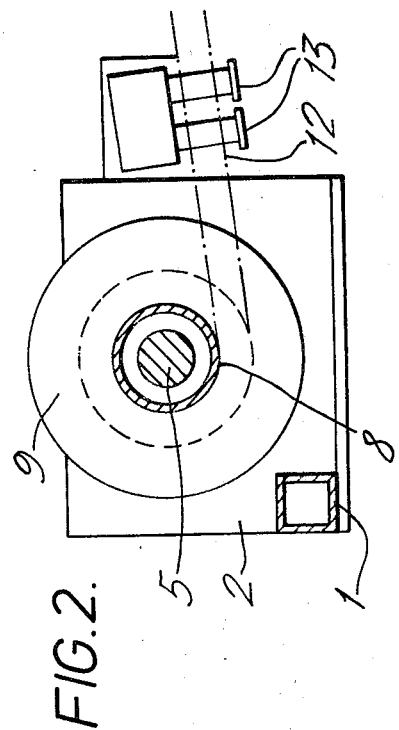
FIG. 2 is a vertical sectional view, at right angles to the drum axis.

FIG. 2 illustrates how a line 12 is carried to/from a drum jacket 8 via a pair of guide rollers 13, the axis plane of which extends at right angles to the axis of the winch, and which are of such a length that the line may be evenly wound on-off the jacket 8, as indicated in FIG. 4.

As apparent, in particular in FIG. 4, the hauling is performed in such a manner that each of the lines 12 initially is hauled on to its proper drum 8, so as to fill the spaces defined by the inner flange 10. When the trawl net 14 arrives with its iron balls 13, it will be wound over the combined widths of the drums 8, without being subjected to bulging or strains in the flanges 10 and with the first balls 15 effectively guided by the outer flanges 9, the balls being gradually distributed inwardly along the length of the jackets 8.

In this manner, not only the trawl tow lines, but also the trawl net proper may be wound on to one and the same winch, until the catch pocket of the net has entered the ramp where it may be taken over by the gallow equipment.

Thus, when using the winch according to the invention, it is, it is true, necessary to have a free deck space aft of the winch, but by the use of only one, single winch, the need for further winches is avoided and deck space is liberated forward in the vessel and, not the least, the anchor winches may be mounted at conventional height without provision of extra ends for the hauling of the trawl.

I claim:

1. A trawl winch for hauling in and paying out a pair of net lines and the net proper, comprising in combination a pair of coaxially mounted separate drums, and independently adjustable individual positive drive means associated with each of the said drums for positively increasing and decreasing the rotational speed of said drums relative to each other, each drum being provided with end flanges of which those situated at the drum ends facing each other are of a diameter which is less than the diameter of the end flanges situated remote from each other, each of said drums being mounted on a common axle, and sleeve members rotatably mounted to opposite ends of said axle and being fixedly mounted to said drums at said remote ends, said sleeve members being connected to said respective drive means for effecting individual drive of said drums so that said net lines which are respectively connected to said drums for being individually wound thereon, may be wound up on said respective drums at suitable speeds under prevailing conditions, and said facing end flanges permitting the net proper to be wound over the combined extent of said drums.

* * * * *